United States Patent
Xue et al.

(10) Patent No.: US 12,001,479 B2
(45) Date of Patent: Jun. 4, 2024

(54) VIDEO PROCESSING METHOD, VIDEO SEARCHING METHOD, TERMINAL DEVICE, AND COMPUTER-READABLE STORAGE MEDIUM

(71) Applicant: SHENZHEN TCL NEW TECHNOLOGY CO., LTD., Guangdong (CN)

(72) Inventors: Kaiwen Xue, Guangdong (CN); Cheungming Lai, Guangdong (CN); Yongze Xu, Guangdong (CN)

(73) Assignee: SHENZHEN TCL NEW TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/758,179

(22) PCT Filed: Aug. 25, 2020

(86) PCT No.: PCT/CN2020/111032
§ 371 (c)(1),
(2) Date: Jun. 29, 2022

(87) PCT Pub. No.: WO2021/135286
PCT Pub. Date: Jul. 8, 2021

(65) Prior Publication Data
US 2023/0044146 A1    Feb. 9, 2023

(30) Foreign Application Priority Data
Dec. 30, 2019    (CN) .......................... 201911424339.3

(51) Int. Cl.
*G06F 16/00* (2019.01)
*G06F 16/78* (2019.01)
(Continued)

(52) U.S. Cl.
CPC ........ *G06F 16/7867* (2019.01); *G06F 16/784* (2019.01); *G06V 10/507* (2022.01);
(Continued)

(58) Field of Classification Search
None
See application file for complete search history.

(56) References Cited

U.S. PATENT DOCUMENTS

| 8,341,152 B1 * | 12/2012 | Bates | ................. G06F 16/7837 |
| | | | 707/706 |
| 2012/0209889 A1 * | 8/2012 | Agnoli | ............. H04N 21/47205 |
| | | | 707/E17.005 |
| 2012/0230588 A1 | 9/2012 | Nakate et al. | |

(Continued)

FOREIGN PATENT DOCUMENTS

| CN | 109508406 A | 3/2019 |
| CN | 110309353 A | 10/2019 |

(Continued)

OTHER PUBLICATIONS

International Search Report in International application No. PCT/CN2020/111032, dated Dec. 1, 2020.
(Continued)

*Primary Examiner* — Anhtai V Tran
(74) *Attorney, Agent, or Firm* — PV IP PC; Wei Te Chung; Zhigang Ma

(57) ABSTRACT

A video processing method, including: according to scenes, editing a video to be edited, and obtaining a target video; acquiring feature parameters of the target video; generating, according to the feature parameters, keywords of the target video; and storing the keywords and the target video associatively.

13 Claims, 4 Drawing Sheets

(51) Int. Cl.
  *G06F 16/783* (2019.01)
  *G06V 10/50* (2022.01)
  *G06V 10/74* (2022.01)
  *G06V 20/40* (2022.01)
  *G06V 40/10* (2022.01)
  *G06V 40/20* (2022.01)

(52) U.S. Cl.
  CPC ............ *G06V 10/761* (2022.01); *G06V 20/46* (2022.01); *G06V 40/10* (2022.01); *G06V 40/20* (2022.01)

(56) References Cited

U.S. PATENT DOCUMENTS

2013/0011121 A1* 1/2013 Forsyth ................ G11B 27/034
  386/245
2015/0375117 A1* 12/2015 Thompson .............. A63F 13/79
  463/9

FOREIGN PATENT DOCUMENTS

CN   110401873 A   11/2019
CN   111177470 A   5/2020

OTHER PUBLICATIONS

Written Opinion of the International Search Authority in international application No. PCT/CN2020/111032, dated Dec. 1, 2020.
European Search Report in European application No. 20908901.0, mailed on Jan. 23, 2024.
Fuhrt Borko et al.:"Introduction to Video Databases" In:"Handbook of Video Databases: Design and Applications", Sep. 30, 2003(2003-09-30), CRC Press, XP093117930 Isbn: 978-0-08493-7006-9 pp. 1-1211, *p. 7-pp. 15 *p. 353.

* cited by examiner

VIDEO PROCESSING METHOD, VIDEO SEARCHING METHOD, TERMINAL DEVICE, AND COMPUTER-READABLE STORAGE MEDIUM

CROSS-REFERENCE TO RELATED APPLICATION

This disclosure claims priority to a Chinese patent application with an application date of Dec. 30, 2019, an application number of 201911424339.3, and an application title of "VIDEO PROCESSING METHOD, VIDEO SEARCHING METHOD, AND TERMINAL DEVICE", which is incorporated by reference in the present application in its entirety.

BACKGROUND OF DISCLOSURE

Technical Field

The present application relates to a field of image processing technology, and in particular, to a video processing method, a video searching method, a terminal device, and a computer-readable storage medium.

Background Technology

With popularity of internet, it is getting easier and easier for viewers to access movies and television (TV) series. Due to long time duration of movies and TV series, the viewers sometimes only want to watch certain highlights; and when they search for keywords to get the highlights, there are often a problem of poor correlation between the keywords and the highlights and a problem of inaccurate description.

The above-mentioned content is only used to assist in understanding a technical solution of the present application, and do not mean to admit that the above-mentioned content is prior art.

BRIEF SUMMARY OF THE DISCLOSURE

Technical Solution

A main purpose of embodiments of the present application is to provide a video processing method, which aims to solve a technical problem of poor correlation between keywords and highlights and a technical problem of inaccurate description when acquiring highlights by searching the keywords in prior art.

In order to solve the above-mentioned problems, a video processing method is provided in an embodiment of the present application, including following contents:
  editing a video to be edited according to scenes and acquiring a target video;
  acquiring feature parameters of the target video;
  generating keywords of the target video according to the feature parameters; and
  storing the keywords and the target video associatively.

According to an embodiment of the present application, the step of acquiring the feature parameters of the target video comprises:
  extracting a plurality of image frames of the target video;
  acquiring sub-feature parameters of the plurality of image frames; and
  acquiring the feature parameters of the target video according to the sub-feature parameters.

According to an embodiment of the present application, the step of acquiring the sub-feature parameters of the plurality of image frames comprises:
  acquiring information on characters in the plurality of image frames; and
  acquiring the sub-feature parameters according to behavior features of the characters corresponding to the information on the characters and human features of the characters corresponding to the information on the characters.

According to an embodiment of the present application, the step of generating the keywords of the target video according to the feature parameters comprises:
  acquiring a behavior feature category corresponding to the behavior features;
  acquiring identity information corresponding to the human features; and
  setting the behavior feature category and the identity information as the keywords of the target video.

According to an embodiment of the present application, the step of acquiring the identity information corresponding to the human features further comprises:
  comparing the human features and preset human features to acquire a comparison result;
  acquiring the preset human features corresponding to the human features according to the comparison result; and
  acquiring the identity information according to the preset human features corresponding to the human features.

According to an embodiment of the present application, the step of editing the video to be edited according to the scenes and acquiring the target video comprises:
  extracting a plurality of image frames of the video to be edited in sequence at a preset frame rate;
  converting the image frames into corresponding grayscale images;
  determining whether there is a scene change in adjacent image frames according to grayscale images of the adjacent image frames;
  taking adjacent image frames with the scene change as division frames when there is the scene change in the adjacent image frames; and
  editing the video to be edited according to the division frames to acquire the target video.

According to an embodiment of the present application, the step of determining whether there is the scene change in the adjacent image frames according to the grayscale images of the adjacent image frames comprises:
  extracting image blocks from the grayscale images corresponding to the adjacent image frames, respectively; and positions and sizes of the image blocks extracted in the adjacent image frames are same;
  acquiring a number of pixels in each image block within each preset grayscale range;
  acquiring an absolute value of a difference between a number of adjacent image frames within each preset grayscale range;
  summing the absolute value of each difference to acquire a sum; and
  determining whether the sum is greater than a preset threshold, wherein determining that there is the scene change in the adjacent image frames when the sum is greater than the preset threshold.

In addition, in order to solve the above-mentioned problems, a video searching method is further provided in an embodiment of the present application, including the following contents:

acquiring target keywords entered in a search interface; and searching a target video in a preset database according to the target keywords and displaying the target video associated with the target keyword.

A terminal device is further provided in an embodiment of the present application, the terminal device comprises a processor, a memory, and a video processing program or a video searching program stored in the memory and executable on the processor; the video processing program is executed by the processor to implement the step of the video processing method mentioned above; and the video searching program is executed by the processor to implement the step of the video searching method mentioned above.

A computer-readable storage medium is further provided in an embodiment of the present application, the computer-readable storage medium stores a video processing program or a video searching program; the video processing program is executed by a processor to implement the step of the video processing method mentioned above; and the video searching program is executed by the processor to implement the step of the video searching method mentioned above.

The video processing method is provided by the embodiments of the present application. Editing according to the scene change, can ensure that the target video is in a same scene, and can effectively improve accuracy of identifying the feature parameters in the target video; the corresponding keywords are generated according to the feature parameters of the target video, so that correlation between the target video and the keywords is strong, and description accuracy is high.

Realization, functional features, and advantages of a purpose of the present application will be further described with reference to the drawings in combination with embodiments.

DETAILED DESCRIPTION OF PREFERRED EMBODIMENTS

It should be understood that specific embodiments described here are only used to explain the present application and are not used to limit the present application.

A main solution of the embodiments of the present application is: editing a video to be edited according to scenes and acquiring a target video; acquiring feature parameters of the target video; generating keywords of the target video according to the feature parameters; and storing the keywords and the target video associatively.

Due to a fact that when searching for keywords to get highlights in prior art, there are often a problem of poor correlation between the keywords and the highlights and a problem of inaccurate description.

A solution is provided in the embodiments of the present application. Editing according to a scene change can ensure that the target video is in a same scene and can effectively improve accuracy of identifying the feature parameters in the target video; corresponding keywords are generated according to the feature parameters of the target video, so that correlation between the target video and the keywords is strong, and description accuracy is high.

Figure 1:
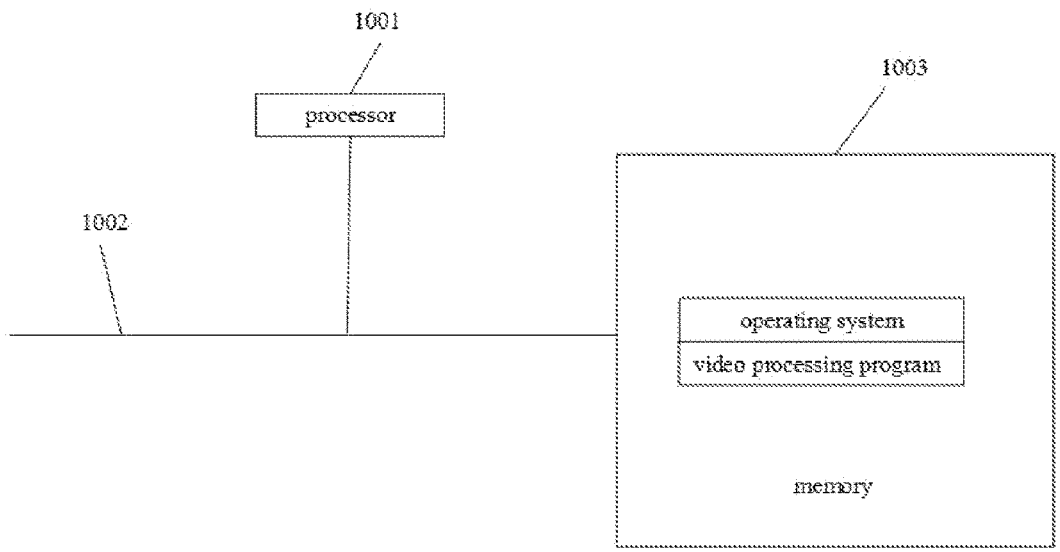
FIG. 1 is a schematic structural diagram of a terminal operated in a hardware operating environment in an embodiment of the present application.

As shown in FIG. 1, FIG. 1 is a schematic structural diagram of a terminal operated in a hardware operating environment in an embodiment of the present application.

An execution body of the embodiment of the present application can be a mobile or non-mobile terminal device such as a personal computer (PC), a smart phone, a tablet computer, or a portable computer, etc.

As shown in FIG. 1, the terminal device may include a processor 1001, such as a central processing unit (CPU), a communication bus 1002, and a memory 1003. Wherein the communication bus 1002 is configured to realize connection and communication between these components. The memory 1003 may be a high-speed random-access memory (RAM) memory or a non-volatile memory, such as a disk memory. The memory 1003 may also be a storage device independent of the aforementioned processor 1001.

Those skilled in the art can understand that a structure of the terminal device shown in FIG. 1 does not constitute a limitation on the terminal. And the terminal device may include more or less components than shown in the drawings, or combine some components, or may have different component arrangements.

As shown in FIG. 1, the memory 1003 as a computer storage medium may include an operating system, a video processing program or a video searching program; and the processor 1001 may be configured to call the video processing program stored in the memory 1003 and perform following steps:

editing a video to be edited according to scenes and acquiring a target video;

acquiring feature parameters of the target video;

generating keywords of the target video according to the feature parameters; and storing the keywords and the target video associatively.

Furthermore, the processor 1001 may be configured to call the video processing program stored in the memory 1003 and perform following steps:

extracting a plurality of image frames of the target video;

acquiring sub-feature parameters of the plurality of image frames; and acquiring the feature parameters of the target video according to the sub-feature parameters.

Furthermore, the processor 1001 may be configured to call the video processing program stored in the memory 1003 and perform following steps:

acquiring information on characters in the plurality of image frames; and acquiring the sub-feature parameters according to behavior features of the characters corresponding to the information on the characters and human features of the characters corresponding to the information on the characters.

Furthermore, the processor 1001 may be configured to call the video processing program stored in the memory 1003 and perform following steps:

acquiring a behavior feature category corresponding to the behavior features;

acquiring identity information corresponding to the human features; and setting the behavior feature category and the identity information as the keywords of the target video.

Furthermore, the processor 1001 may be configured to call the video processing program stored in the memory 1003 and perform following steps:

comparing the human features and preset human features and acquiring a comparison result;

acquiring the preset human features corresponding to the human features according to the comparison result; and acquiring the identity information according to the preset human features corresponding to the human features.

Furthermore, the processor 1001 may be configured to call the video processing program stored in the memory 1003 and perform following steps:

extracting the plurality of image frames of the video to be edited in sequence at a preset frame rate;

converting the image frames into corresponding grayscale images;

determining whether there is a scene change in adjacent image frames according to grayscale images of the adjacent image frames;

taking adjacent image frames with the scene change as division frames when there is the scene change in the adjacent image frames; and editing the video to be edited according to the division frames to acquire the target video.

Furthermore, the processor 1001 may be configured to call the video processing program stored in the memory 1003 and perform following steps:

extracting image blocks from the grayscale images corresponding to the adjacent image frames, respectively; and positions and sizes of the image blocks extracted in the adjacent image frames are same;

acquiring a number of pixels in each image block within each preset grayscale range;

acquiring an absolute value of a difference between a number of adjacent image frames within each preset grayscale range;

summing the absolute value of each difference to acquire a sum; and determining whether the sum is greater than a preset threshold, wherein determining that there is the scene change in the adjacent image frames when the sum is greater than the preset threshold.

Furthermore, the processor 1001 may be configured to call the video searching program stored in the memory 1003 and perform following steps:

acquiring target keywords entered in a search interface; and searching the target video in a preset database according to the target keywords and displaying the target video associated with the target keywords.

Figure 2:
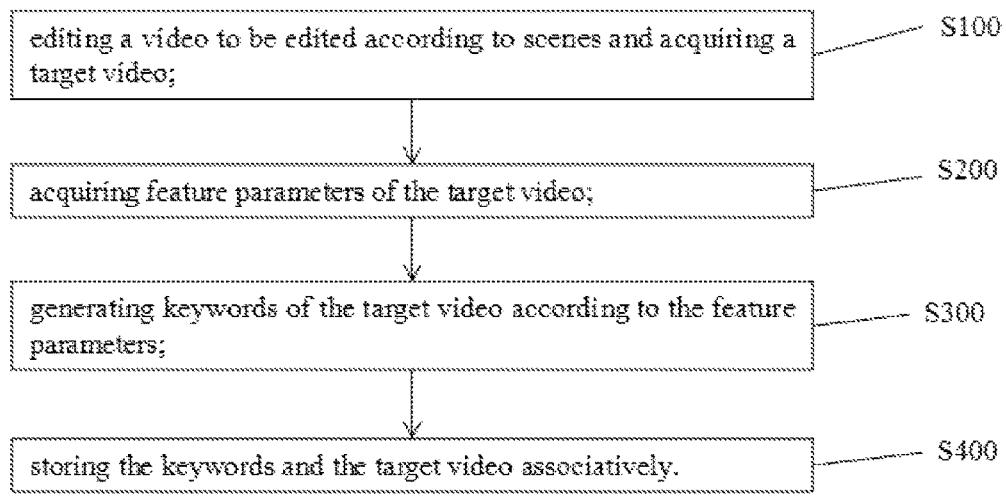
FIG. 2 is a flowchart of a video processing method in a first embodiment of the present application.

According to the structure of the above-mentioned terminal, a first embodiment of the present application is provided. Referring to FIG. 2, FIG. 2 is a flowchart of a video processing method in a first embodiment of the present application. The video processing method includes following steps:

step S100: editing a video to be edited according to scenes and acquiring a target video;

In the embodiment, an execution body is a terminal device. The video to be edited can be any video that can be edited, such as movies, TV series, or recorded videos.

After acquiring the video to be edited, a plurality of image frames of the video to be edited are extracted at a preset frame rate. Wherein the preset frame rate refers to a number of video frames extracted per unit of time, and can be set according to requirements, such as 50 frames per minute. It can be understood that the greater the preset frame rate, the higher editing accuracy.

The scenes may be determined according to a change in content of adjacent image frames in the plurality of image frames mentioned above. When the scenes are changed, division frames corresponding to the video to be edited are determined, so that the target video is acquired. It can be understood that the target video can be a video where any scene in the video to be edited is located. A time duration of the target video is determined by the scenes of the video to be edited, e.g., 3 minutes.

Optionally, the video to be edited can be edited into target videos with different scenes.

Optionally, the video to be edited can be edited through any one of ffmpeg, shotdetect, or pyscenedetect. Considering speed and accuracy, the ffmpeg method is preferred for editing.

step S200: acquiring feature parameters of the target video;

Editing the video to be edited according to the scene change to acquire the target video. The feature parameters include one or more of scene parameters, information on characters, or sound parameters. Because the target video is edited according to the scenes, the scene parameters are relatively stable, such as "amusement park", "bus", "indoor", or "beach", etc. The information on the characters may include behavior features of the characters and identity information of the characters. The sound parameters may include one or more of key information in speech, such as volume, pitch, and noise. The scene parameters and the information on the characters can be identified through image identification technology, and the sound parameters can be identified through voice identification technology.

step S300: generating keywords of the target video according to the feature parameters; and The acquired feature parameters can be matched with pre-stored feature parameters in a database on the terminal device. When matching degree is high, keywords corresponding to the feature parameters can be acquired, and then keywords of the target video can be generated.

Optionally, keywords corresponding to the scenes can be generated according to the scene parameters, such as "beach". According to the information on the characters, keywords of the behavior features corresponding to the characters and keywords of the identity information corresponding to the characters can be generated. For example, "sunbathing" can be the keyword of the behavior features, and "a public figure" can be the keyword of the identity information. Sound keywords can be generated according to the sound parameters, such as "noisy". According to the information, keywords like "a public figure sunbathes at a noisy beach" can be generated.

step S400: storing the keywords and the target video associatively.

After generating the keywords of the target video, the keywords and the target video are associated with each other, and the target video and the keywords associated with the target video are stored in the terminal device or in a cloud database.

In the embodiment, editing according to the scene change can ensure the target video is in a same scene, and can effectively improve accuracy of identifying the feature parameters in the target video; the corresponding keywords are generated according to the feature parameters of the target video, so that correlation between the target video and the keywords is strong, and description accuracy is high.

Figure 3:
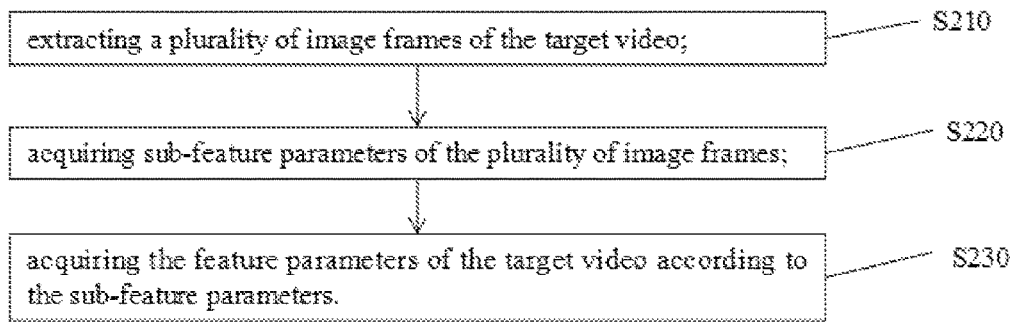
FIG. 3 is a flowchart of a video processing method in a second embodiment of the present application.

As shown in FIG. 3, FIG. 3 is a flowchart of a video processing method in a second embodiment of the present application. FIG. 3 is also a detailed flowchart of the step S200. According to the above-mentioned first embodiment, the step S200 includes:

step S210: extracting a plurality of image frames of the target video;

step S220: acquiring sub-feature parameters of the plurality of image frames; and step S230: acquiring feature parameters of the target video according to the sub-feature parameters.

In the embodiment, extracting the plurality of image frames from the target video at the preset frame rate can reduce a number of video frames processed by the terminal device, and improve efficiency of acquiring content of the target video.

The sub-feature parameters of each image frame can be identified one by one. Since the image frame loses sound information, the sub-feature parameters include at least one of the scene parameters or the information on the characters.

Optionally, since the target video is in a same scene and the scene parameters are fixed, the information on the characters of the sub-feature parameters is mainly acquired according to each image frame.

Optionally, the plurality of image frames mentioned above are input to a neural network model, and the characters and the scenes in the plurality of image frames can be extracted through a three-dimensional convolutional network to acquire the information on the characters and the scene information.

Since the target video is in the same scene, scene parameters of any image frame in the plurality of image frames can be taken as the scene parameters of the feature parameters of the target video. The target video contains only one behavior, therefore, information on characters of each sub-feature parameter can be integrated to acquire the information on the characters of the feature parameters. For example, behavior feature of "squatting" may include three sub-behavior features consisting of a target character standing, the target character bending legs, and the target character squatting. For another example, after acquiring facial features of a target character in each image frame, an average value of each facial feature can be calculated, such as a distance between eyes, size of glasses, or a thickness of lips, etc., and total facial features of each image frame can be acquired.

According to the sub-feature parameters, the feature parameters can include at least one of the scene parameters and the information on the characters.

In the embodiment, by extracting the plurality of image frames from the target video, extracting the sub-feature parameters from each image frame to acquire the feature parameters, and integrating the sub-feature parameters of the plurality of image frames, the feature parameters can reflect key information of the target video as a whole, so as to improve accuracy of understanding of the target video.

Figure 4:
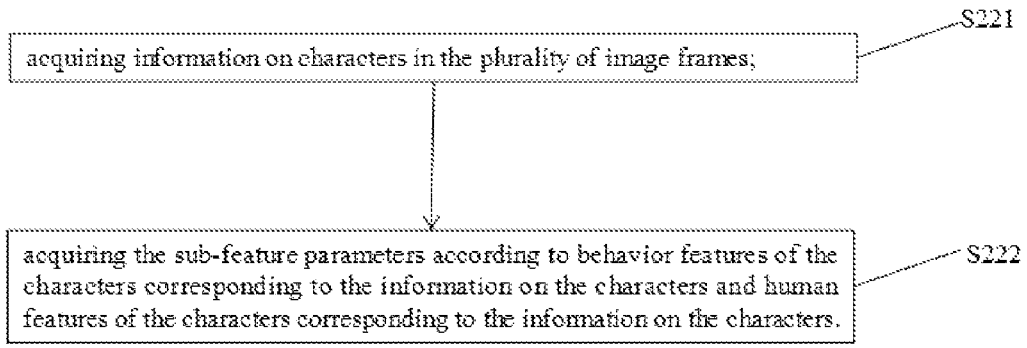
FIG. 4 is a flowchart of a video processing method in a third embodiment of the present application.

Referring to FIG. 4, FIG. 4 is a flowchart of a video processing method in a third embodiment of the present application. According to the above-mentioned second embodiment, FIG. 4 is also a detailed flowchart of the step S220 in FIG. 3. The step of acquiring the sub-feature parameters of the plurality of image frames includes:

step S221: acquiring information on characters in the plurality of image frames; and step S222: acquiring the sub-feature parameters according to behavior features of the characters corresponding to the information on the characters and human features of the characters corresponding to the information on the characters.

Since searching short videos or highlights according to the information on the characters is more in line with reality of user search; therefore, in the embodiment, the sub-feature parameters include the information on the characters.

The information on the characters can include behavior features of the characters and human features of the characters. Wherein the behavior features can be any one behavior of human activities, such as waving, quarreling, or running, and the behavior features can include behavior of a target character in each image frame. The human features may include at least one of facial features, iris features, or body features of the target character in each image frame.

The target character in the image frame, position coordinates of the target character in the image frame, behavior start time of the target character, and behavior end time of the target character can be identified by a neural network. Wherein, when there are a plurality of characters on the image frame, there can be a plurality of target characters.

In the embodiment, by acquiring the information on the characters in the plurality of image frames, the sub-feature parameters are acquired according to the behavior features of the characters corresponding to the information on the characters and the human features of the characters corresponding to the information on the characters. And the information on the characters with high identification is taken as the feature parameters to make it more in line with a user's search logic, making understanding of the target video more vivid.

Figure 5:
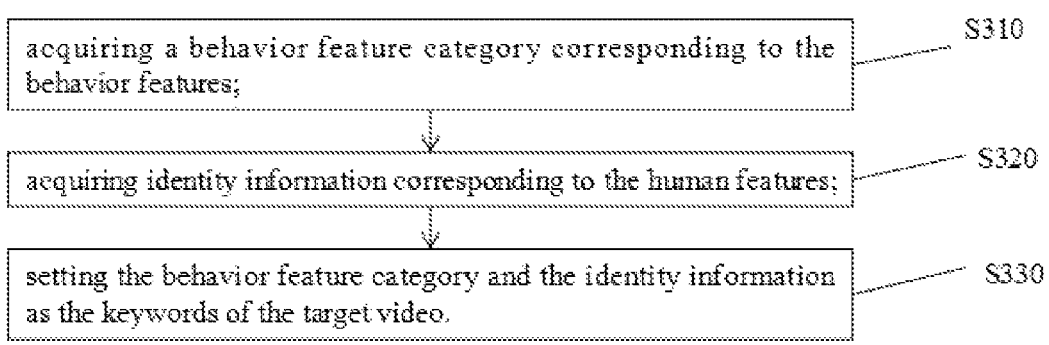
FIG. 5 is a flowchart of a video processing method in a fourth embodiment of the present application.

Referring to FIG. 5, FIG. 5 is a flowchart of a video processing method in a fourth embodiment of the present application. FIG. 5 is also a detailed flowchart of the step S300 in FIG. 4. According to the above-mentioned third embodiment, the step S300 includes:

step S310: acquiring a behavior feature category corresponding to the behavior features;

step S320: acquiring identity information corresponding to the human features; and step S330: setting the behavior feature category and the identity information as the keywords of the target video.

In the embodiment, the behavior feature category can be any one of human action, such as dancing, squatting, or skating, etc. The identity information may include one or more of name, gender, or age of a public figure.

After acquiring the behavior features of the target character in the target video, the behavior features are classified to acquire the behavior feature category corresponding to the behavior features.

Optionally, the above-mentioned extracted plurality of image frames can be input into the neural network model. Position coordinates of the target character in the image frame can be identified through the neural network model, and then the behavior features of the target character can be extracted according to the position coordinates of the target character through a three-dimensional convolutional network, and a corresponding weight can be acquired. The behavior feature category corresponding to the behavior features of the target character can be calculated according to the behavior features of the target character and the corresponding weight.

Optionally, the neural network model can be trained by tens of thousands of image frames with known behavior features. The behavior feature categories calculated by the neural network model can be compared with actual behavior features through a loss function, so as to continuously optimize parameters of the neural network model and improve accuracy of the neural network model in identifying the behavior features of the characters in the image frames.

The human features of the target character in the target video can be compared with human features of a character with known identity information pre-stored in the terminal device. If the facial features are compared with preset facial features, correlation is greater than a preset value, and when the correlation is greatest, identity information of a character with greater correlation is taken as identity information of the target character to acquire the identity information of the target character. Iris features and human features are similar with the facial features and will not be repeated here.

The behavior feature category is set as a behavior keyword of the target video, and the identity information of the target character in the target video is set as a character keyword of the target video. For example, in a target video, "a man takes a box from a woman". By extracting three image frames, the target characters being a man and a woman can be determined. Behavior features of the man and the woman can be identified, respectively. The identity information of the target character, such as "Will Smith", can be identified through any one of the human features of the target character, such as the facial features, the iris features, and the body features. The behavior feature category of the target character is set as the behavior keyword of the target video, that is, "take the box". The identity information of the target character as the character keyword of the target video, such as "Will Smith and a woman". Combining the behavior keyword and character keyword of the target video, it can be concluded that the keywords of the target video is "Will Smith took a box from a woman".

Optionally, the behavior start time of the target character and the behavior end time of the target character are further added to the keywords of the target video, such as "from eleven minutes thirteen seconds to twelve minutes fourteen seconds, Will Smith takes a box from a woman".

In the embodiment, according to the behavior features and the human features of the information on the characters in the target video, the behavior feature category and the identity information of the target character are acquired. The behavior feature category and the identity information are set as the keywords of the target video, so that behavior and character identity information in the target video are identified and are converted into the keywords of the target video, which can accurately summarize the behavior and identity of the character in the target video.

Figure 6:
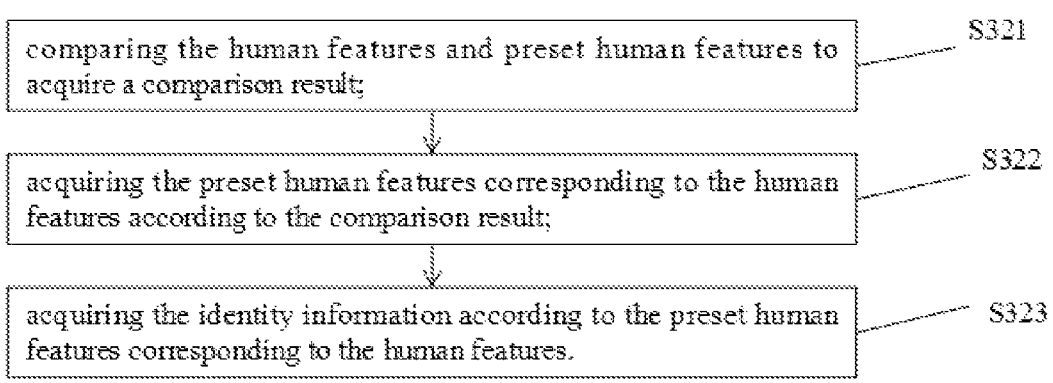
FIG. 6 is a flowchart of a video processing method in a fifth embodiment of the present application.

Referring to FIG. 6, FIG. 6 is a flowchart of a video processing method in a fifth embodiment of the present application. FIG. 6 is also a detailed flowchart of the step S320 in FIG. 5. According to the above-mentioned fourth embodiment, the step S320 includes:

step S321: comparing the human features and preset human features to acquire a comparison result;

step S322: acquiring the preset human features corresponding to the human features according to the comparison result; and step S323: acquiring the identity information according to the preset human features corresponding to the human features.

After acquiring the human features of the information on the characters in the target video, the human features may include one or more of facial features, iris features, and body features. The preset human features are corresponding to the human features. If the human features are the facial features, the corresponding preset human features are the preset facial features. If the human features are the iris features, the corresponding preset human features are preset iris features. If the human features are the body features, the corresponding preset human features are preset body features. If there are a plurality of human features, there are also a plurality of preset human features. The facial features are taken as an example for illustration.

The facial features of the information on the characters are compared with preset facial features in the database on the terminal device, wherein identity information of a character corresponding to the preset facial features is known.

The comparison result can be determined according to whether a difference between a feature value of the facial features and a feature value of the preset facial features is greater than a preset difference. The comparison result includes one of a successful matching or a failed matching.

When the comparison result is matched successfully, identity information of the preset facial features corresponding to the facial features is taken as the identity information of the character with the facial features.

Optionally, the feature value can be a 128-dimensional vector of faces. A 128-dimensional vector of the target character in the target video can be acquired through the facial features; and then the 128-dimensional vector of the target character and 128-dimensional vector of the preset facial features are vectorially different to acquire a difference value. When the difference value is less than or equal to the preset value, the identity information corresponding to the preset facial features is taken as the identity information corresponding to the human features. If the difference between the facial features and all preset facial features in the database is greater than the preset value, a target character corresponding to the facial features is not a well-known figure. The identity information corresponding to the facial features can be acquired by gender and age, such as "grandmother".

Furthermore, identity information of the preset human features corresponding to the human features is taken as the identity information of the character with the human features.

In the embodiment, by comparing the human features and the preset human features, the comparison result is acquired, and the preset human features corresponding to the human features are acquired. The identity information of the preset human features is taken as the identity information of the character with human features, the identity information of the target character in the target video can be accurately identified.

Figure 7:
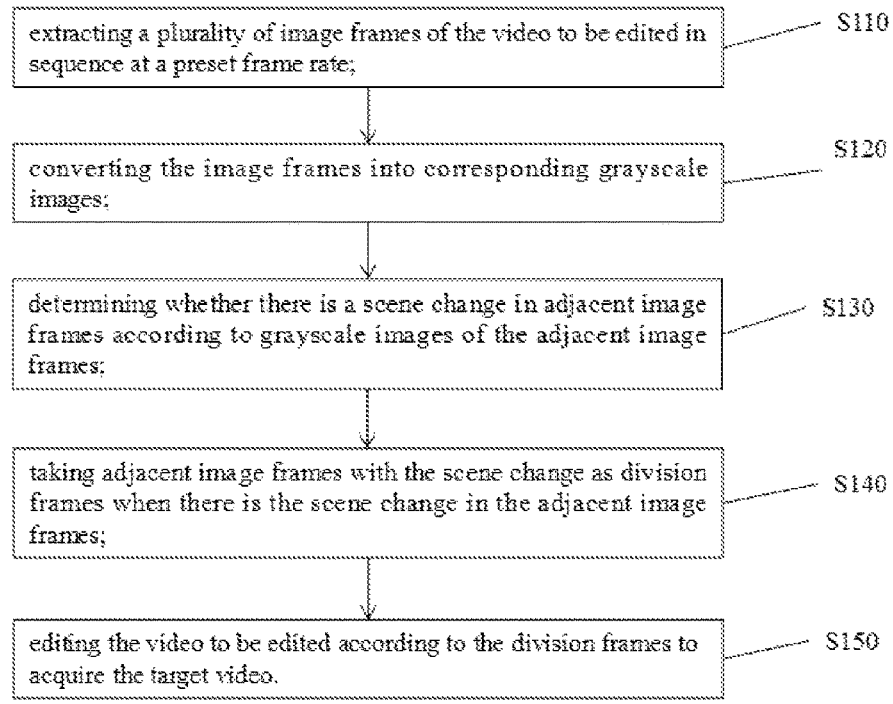
FIG. 7 is a flowchart of a video processing method in a sixth embodiment of the present application.

Referring to FIG. 7, FIG. 7 is a flowchart of a video processing method in a sixth embodiment of the present application. FIG. 7 is also a detailed flowchart of the step S100 in FIG. 2. According to any one of the above-mentioned first embodiment to the fifth embodiment, the step S100 includes:

step S110: extracting a plurality of image frames of the video to be edited in sequence at a preset frame rate;

The preset frame rate can be set according to requirements of designers. It is necessary to comprehensively consider accuracy and efficiency of editing, such as 30 frames per minute. The plurality of image frames of the video to be edited are extracted in sequence at the preset frame rate. It can be understood that the plurality of image frames are acquired in sequence and at a same time interval;

step S120: converting the image frames into corresponding grayscale images;

step S130: determining whether there is a scene change in adjacent image frames according to grayscale images of the adjacent image frames;

step S140: taking adjacent image frames with the scene change as division frames when there is the scene change in the adjacent image frames; and step S150: editing the video to be edited according to the division frames to acquire the target video.

Each extracted image frame is converted into the grayscale image, and whether there is the scene change can be determined by comparing a change of content in the grayscale image of the adjacent image frames. It can be understood that when the change of the content in the grayscale image of the adjacent image frames is greater than a set value, it is considered that the scene has changed; when the change of the content in the grayscale image of the adjacent image frames is less than or equal to the set value, it is considered that the scene has not changed.

The adjacent image frames with the scene change are taken as the division frames when there is the scene change in the adjacent image frames. A previous image frame can be set as an ending division frame of a previous target video, and a next image frame can be set as a starting division frame of a next target video. It can be understood that there can be a plurality of division frames in the video to be edited, which can be divided into the target videos with different scenes.

The video to be edited is edited according to the division frames to acquire the target video.

In the embodiment, by extracting the plurality of image frames of the video to be edited, the image frames are converted into the grayscale images, and whether there is the scene change is determined according to the grayscale images of the adjacent image frames. When there is the scene change, the adjacent image frames with the scene change are taken as the division frames; and the video to be edited is edited according to the division frames to acquire the target video, which makes editing accurate, simple, and efficient.

Figure 8:
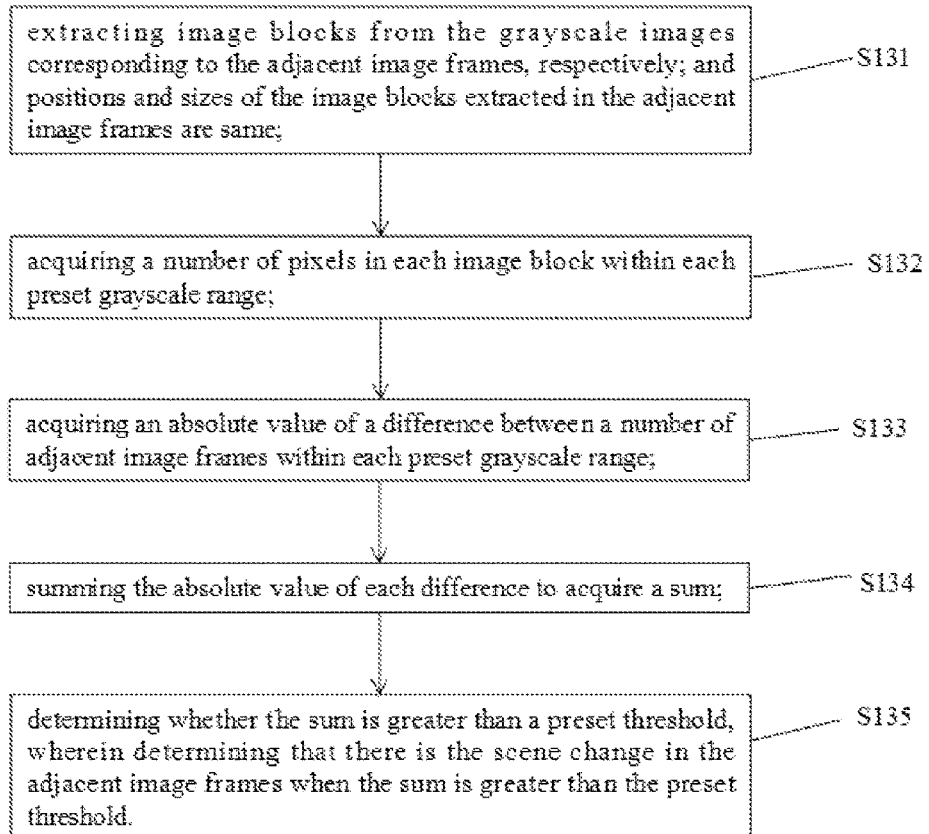
FIG. 8 is a flowchart of a video processing method in a seventh embodiment of the present application.

Referring to FIG. 8, FIG. 8 is a flowchart of a video processing method in a seventh embodiment of the present application. FIG. 8 is also a detailed flowchart of the step S130 in FIG. 7. According to the above-mentioned sixth embodiment, the step S130 includes:

step S131: extracting image blocks from grayscale images corresponding to the adjacent image frames, respectively; and positions and sizes of the image blocks extracted in the adjacent image frames are same.

In the embodiment, the image blocks are extracted from the grayscale images corresponding to the adjacent image frames, respectively. Wherein coordinates of an upper left corner of the image block are randomly generated, and a size of the image block is also randomly generated. It can be understood that the position and the size of the image blocks extracted from the adjacent image frames are same, which is conducive to a subsequent comparison;

step S132: acquiring a number of pixels in each image block within each preset grayscale range;

step S133: acquiring an absolute value of a difference between a number of adjacent image frames within each preset grayscale range;

step S134: summing the absolute value of each difference to acquire a sum.

The image block is composed of pixels. For example, the image block of 10 pixels multiplied by 10 pixels includes 100 pixels. The pixels have grayscale values, which can be integers between 0 and 255. Preset grayscale range can be set according to requirements, such as 0-4, 5-9, 10-14, etc. It can be understood that the smaller the preset grayscale range, the greater accuracy, but the lower speed.

Each pixel is corresponding to a preset grayscale range, and a number of pixels in each image block within each preset grayscale range can be acquired, respectively.

After acquiring the number of pixels in each image block within each preset grayscale range, a difference of the number of pixels corresponding to the image block of the adjacent image frames within each preset grayscale range is calculated; and an absolute value of each difference is acquired, that is, the absolute value of the differences. The absolute value of each difference is summed to acquire the sum.

Optionally, by drawing a histogram of each image block, the sum can be calculated according to a number of pixels of the histogram within each preset grayscale range and the absolute value of the differences between the number of pixels of the histogram within each preset grayscale range.

And step S135: determining whether the sum is greater than a preset threshold, wherein determining that there is the scene change in the adjacent image frames when the sum is greater than the preset threshold.

The preset threshold can be a threshold set by the designers to determine whether the scene has changed. Whether there is the scene change in the adjacent image frames is determined by determining whether the sum is greater than the preset threshold. When the sum is less than or equal to the preset threshold, it is determined that there is no scene change in the adjacent image frames. When the sum is greater than the preset threshold, it is determined that there is the scene change in the adjacent image frames.

In the embodiment, by acquiring the image blocks of the adjacent image frames, calculating the number of pixels in the image blocks within each preset grayscale range and the absolute value of the difference between the number of pixels within each preset grayscale range, the sum is calculated. According to a relationship between the sum and the preset threshold, whether there is the scene change in the adjacent image frames is determined; and whether there is the scene change is determined by random extraction and one by one comparison, so as to make the video editing accuracy high and comprehensive.

Figure 9:
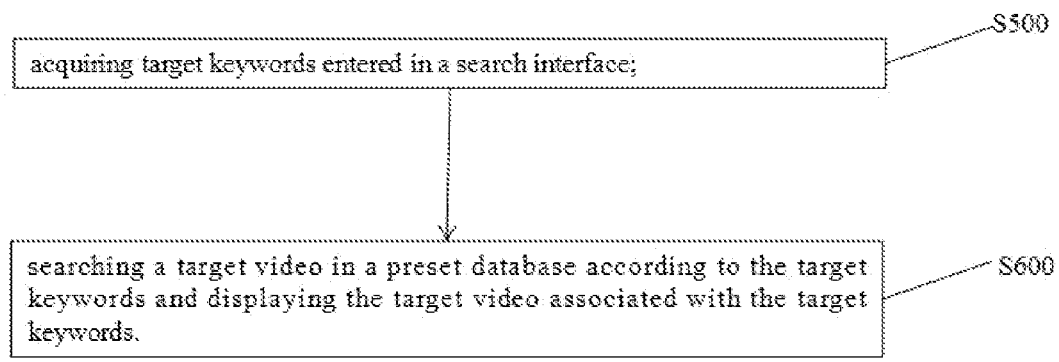
FIG. 9 is a flowchart of a video searching method in an eighth embodiment of the present application.

Referring to FIG. 9, FIG. 9 is a flowchart of a video searching method in an eighth embodiment of the present application. The video searching method includes:

step S500: acquiring target keywords entered in a search interface; and step S600: searching the target video in a preset database according to the target keywords and displaying the target video associated with the target keywords.

In the embodiment, the target video is acquired by the video processing method mentioned above. That is, a long video is divided into a plurality of short videos according to the scenes. Wherein the target video is stored in a preset database, and the keywords associated with the target video are also stored in the preset database.

The terminal device can output a search interface on a current interface and acquire the target keywords input by users through the search interface. Wherein, the target keyword may be a query entered by the users. The preset database may include at least one of a cloud database or a local database.

The terminal device can match and search in the preset database according to the target keywords, and associated keywords corresponding to the target keywords in the preset database is found to acquire the corresponding target video according to the associated keywords, and to sequentially display the target videos corresponding to preset keywords on a current display interface according to matching similarity.

In the embodiment, by acquiring the target keyword input by the users, target videos in the preset database according to the target keywords are searched, and the target video corresponding to the target keywords is displayed. Because the keywords corresponding to the target video itself have features of strong relevance and high description accuracy, the corresponding target video by inputting the target keywords is acquired, which makes searching accuracy high.

In addition, a terminal device is further provided in an embodiment of the present application. The terminal device includes a processor, a memory, and a video processing program or a video searching program stored in the memory and executable on the processor. The video processing program is executed by the processor to implement the content of the embodiments of the video processing method mentioned above. The video searching program is executed by the processor to implement the content of the embodiments of the video searching method mentioned above.

A computer readable storage medium is further provided by an embodiment of the present application. The computer readable storage medium stores the video processing program or the video searching program. The video processing program is executed by the processor to implement the content of the embodiments of the video processing method mentioned above. The video searching program is executed by the processor to implement the content of the embodiments of the video searching method mentioned above.

The above-mentioned serial number of the embodiments of the present application is only for description and does not represent advantages and disadvantages of the embodiments.

It should be noted that in the present application, terms "include", "including" or any other variation thereof are intended to cover non-exclusive inclusion, so that a process, method, object, or device including a series of elements includes not only those elements, but also other elements not explicitly listed, or elements inherent in such process, method, object, or device. Without further restrictions, the element defined by the statement "including a . . . " does not exclude existence of another identical element in the process, method, object, or device including the element.

Through the description of the above-mentioned embodiments, those skilled in the art can clearly understand that the above-mentioned embodiment method can be realized by means of software and necessary general hardware platform. Of course, it can also be realized by hardware, but in many cases, the former is a better embodiment. According to this understanding, a technical solution of the present application is essentially or a part that contributes to the prior art can be embodied in a form of a software product, which is stored in a computer-readable storage medium (such as ROM, RAM, magnetic disc, or optical disc) as mentioned above. It includes several instructions to enable a terminal device (which can be a mobile phone, a computer, a server, an air conditioner, or a network device) to execute the methods described in various embodiments of the present application.

The above-mentioned description is only a preferred embodiment of the present application and does not limit a scope of patent protection of the present application. All equivalent structure or equivalent process transformations made by using contents of the description and attached drawings of the present application, or directly or indirectly applied in other relevant technical fields, are similarly included in the scope of patent protection of the present application.

What is claimed is:

1. A video processing method, wherein the video processing method comprises following steps:
    editing a video to be edited, according to scenes in the video to be edited, into a plurality of segments as a plurality of target videos respectively corresponding to the plurality of scenes, wherein each of the target videos is a video where a corresponding one of the plurality of scenes is located;
    acquiring feature parameters of each of the target videos;
    generating keywords of each of the target videos according to the feature parameters of the target video; and
    storing each of the target videos and the keywords of the target video associatively,
    wherein the step of editing the video to be edited, according to the scenes in the video to be edited, into a plurality of segments as a plurality of target videos respectively corresponding to the plurality of scenes comprises:
    extracting a plurality of image frames of the video to be edited in sequence at a preset frame rate;
    converting the image frames into corresponding grayscale images;
    determining whether there is a scene change in adjacent ones of the image frames according to the grayscale images of the adjacent ones of the image frames;
    taking the adjacent ones of the image frames with the scene change as division frames when there is the scene change in the adjacent ones of the image frames; and
    editing the video to be edited according to the division frames to acquire the target video, and
    wherein the step of determining whether there is the scene change in the adjacent ones of the image frames according to the grayscale images of the adjacent ones of the image frames comprises:
    extracting image blocks from the grayscale images corresponding to the adjacent ones of the image frames, respectively;
    acquiring a number of pixels in each image block within each of preset grayscale ranges, to obtain numbers of pixels respectively in the adjacent ones of the image frames within each of the preset grayscale ranges;
    acquiring an absolute value of a difference between the numbers of the pixels in the adjacent ones of the image frames within each of the preset grayscale ranges, to obtain absolute values of differences respectively within respective ones of the preset grayscale ranges;
    summing the absolute values of the differences to acquire a sum; and
    determining whether the sum is greater than a preset threshold, wherein it is determined that there is the scene change in the adjacent ones of the image frames when the sum is greater than the preset threshold.

2. The video processing method as claimed in claim 1, wherein the step of acquiring the feature parameters of each of the target videos comprises:
  extracting a plurality of image frames of the target video;
  acquiring sub-feature parameters of the plurality of image frames of the target video; and
  acquiring the feature parameters of the target video according to the sub-feature parameters.

3. The video processing method as claimed in claim 2, wherein the step of acquiring the sub-feature parameters of the plurality of image frames of the target video comprises:
  acquiring information on characters in the plurality of image frames of the target video; and
  acquiring the sub-feature parameters according to behavior features of the characters corresponding to the information on the characters and human features of the characters corresponding to the information on the characters.

4. The video processing method as claimed in claim 3, wherein the step of generating the keywords of the target video according to the feature parameters of the target video comprises:
  acquiring a behavior feature category corresponding to the behavior features;
  acquiring identity information corresponding to the human features; and
  setting the behavior feature category and the identity information as the keywords of the target video.

5. The video processing method as claimed in claim 4, further comprising:
  adding behavior start time of a target character and behavior end time of the target character to the keywords of the target video.

6. The video processing method as claimed in claim 4, wherein the step of acquiring the identity information corresponding to the human features further comprises:
  comparing the human features and preset human features to acquire a comparison result;
  acquiring the preset human features corresponding to the human features according to the comparison result; and
  acquiring the identity information according to the preset human features corresponding to the human features.

7. The video processing method as claimed in claim 6, wherein the human features comprise one or more of facial features, iris features, and body features, and the preset human features are corresponding to the human features.

8. The video processing method as claimed in claim 6, further comprising:
  determining that the comparison result is matched successfully and taking the identity information of the preset human features corresponding to the human features as identity information of the characters with the human features.

9. The video processing method as claimed in claim 1, wherein the step of determining whether there is the scene change in the adjacent ones of the image frames according to the grayscale images of the adjacent ones of the image frames comprises:
  extracting image blocks from the grayscale images corresponding to the adjacent ones of the image frames, respectively; and positions and sizes of the image blocks extracted in the adjacent ones of the image frames are same;
  acquiring a number of pixels in each image block within each of preset grayscale ranges, to obtain numbers of pixels respectively in the adjacent ones of the image frames within each of the preset grayscale ranges;
  acquiring an absolute value of a difference between the numbers of the pixels in the adjacent ones of the image frames within each of the preset grayscale ranges, to obtain absolute values of differences respectively within respective ones of the preset grayscale ranges;
  summing the absolute values of the differences to acquire a sum; and
  determining whether the sum is greater than a preset threshold, wherein determining that there is the scene change in the adjacent ones of the image frames when the sum is greater than the preset threshold.

10. The video processing method as claimed in claim 1, wherein the feature parameters comprise one or more of scene parameters, information on characters, or sound parameters.

11. A video searching method, wherein the video searching method comprises following steps:
  acquiring target keywords entered in a search interface; and
  searching a target video in a preset database according to the target keywords and displaying the target video associated with the target keywords; wherein the target video is acquired according to a video processing method,
  wherein the video processing method comprises:
  editing a video to be edited, according to scenes in the video to be edited, into a plurality of segments as a plurality of target videos respectively corresponding to the plurality of scenes, wherein each of the target video is a video where a corresponding one of the plurality of scenes is located;
  acquiring feature parameters of each of the target videos;
  generating keywords of each of the target videos according to the feature parameters of the target video; and
  storing each of the target videos and the keywords of the target video associatively,
  wherein the step of editing the video to be edited, according to the scenes in the video to be edited, into a plurality of segments as a plurality of target videos respectively corresponding to the plurality of scenes comprises:
  extracting a plurality of image frames of the video to be edited in sequence at a preset frame rate;
  converting the image frames into corresponding grayscale images;
  determining whether there is a scene change in adjacent ones of the image frames according to the grayscale images of the adjacent ones of the image frames;
  taking the adjacent ones of the image frames with the scene change as division frames when there is the scene change in the adjacent ones of the image frames; and
  editing the video to be edited according to the division frames to acquire the target video, and
  wherein the step of determining whether there is the scene change in the adjacent ones of the image frames according to the grayscale images of the adjacent ones of the image frames comprises:
  extracting image blocks from the grayscale images corresponding to the adjacent ones of the image frames, respectively;
  acquiring a number of pixels in each image block within each of preset grayscale ranges, to obtain numbers of pixels respectively in the adjacent ones of the image frames within each of the preset grayscale ranges;
  acquiring an absolute value of a difference between the numbers of the pixels in the adjacent ones of the image frames within each of the preset grayscale ranges, to obtain absolute values of differences respectively within respective ones of the preset grayscale ranges;

summing the absolute values of the differences to acquire a sum; and determining whether the sum is greater than a preset threshold, wherein determining that there is the scene change in the adjacent ones of the image frames when the sum is greater than the preset threshold.

12. A terminal device, wherein the terminal device comprises a processor, a memory, and a video processing program or a video searching program stored in the memory and executable on the processor; the video processing program is executed by the processor to implement operations of a video processing method, wherein the video processing method comprises:

editing a video to be edited, according to scenes in the video to be edited, into a plurality of segments as a plurality of target videos respectively corresponding to the plurality of scenes, wherein each of the target video is a video where a corresponding one of the plurality of scenes is located;

acquiring feature parameters of each of the target videos;

generating keywords of each of the target videos according to the feature parameters of the target video; and storing each of the target videos and the keywords of the target video associatively, wherein the step of editing the video to be edited, according to the scenes in the video to be edited, into a plurality of segments as a plurality of target videos respectively corresponding to the plurality of scenes comprises:

extracting a plurality of image frames of the video to be edited in sequence at a preset frame rate;

converting the image frames into corresponding grayscale images;

determining whether there is a scene change in adjacent ones of the image frames according to the grayscale images of the adjacent ones of the image frames;

taking the adjacent ones of the image frames with the scene change as division frames when there is the scene change in the adjacent ones of the image frames; and editing the video to be edited according to the division frames to acquire the target video, and wherein the step of determining whether there is the scene change in the adjacent ones of the image frames according to the grayscale images of the adjacent ones of the image frames comprises:

extracting image blocks from the grayscale images corresponding to the adjacent ones of the image frames, respectively;

acquiring a number of pixels in each image block within each of preset grayscale ranges, to obtain numbers of pixels respectively in the adjacent ones of the image frames within each of the preset grayscale ranges;

acquiring an absolute value of a difference between the numbers of the pixels in the adjacent ones of the image frames within each of the preset grayscale ranges, to obtain absolute values of differences respectively within respective ones of the preset grayscale ranges;

summing the absolute values of the differences to acquire a sum; and determining whether the sum is greater than a preset threshold, wherein determining that there is the scene change in the adjacent ones of the image frames when the sum is greater than the preset threshold.

13. A computer-readable storage medium, wherein the computer-readable storage medium stores a video processing program or a video searching program; the video processing program is executed by a processor to implement operations of a video processing method, wherein the video processing method comprises:

editing a video to be edited, according to scenes in the video to be edited, into a plurality of segments as a plurality of target videos respectively corresponding to the plurality of scenes, wherein each of the target video is a video where a corresponding one of the plurality of scenes is located;

acquiring feature parameters of each of the target videos;

generating keywords of each of the target videos according to the feature parameters of the target video; and storing each of the target videos and the keywords of the target video associatively, wherein the step of editing the video to be edited, according to the scenes in the video to be edited, into a plurality of segments as a plurality of target videos respectively corresponding to the plurality of scenes comprises:

extracting a plurality of image frames of the video to be edited in sequence at a preset frame rate;

converting the image frames into corresponding grayscale images;

determining whether there is a scene change in adjacent ones of the image frames according to the grayscale images of the adjacent ones of the image frames;

taking the adjacent ones of the image frames with the scene change as division frames when there is the scene change in the adjacent ones of the image frames; and editing the video to be edited according to the division frames to acquire the target video, and wherein the step of determining whether there is the scene change in the adjacent ones of the image frames according to the grayscale images of the adjacent ones of the image frames comprises:

extracting image blocks from the grayscale images corresponding to the adjacent ones of the image frames, respectively;

acquiring a number of pixels in each image block within each of preset grayscale ranges, to obtain numbers of pixels respectively in the adjacent ones of the image frames within each of the preset grayscale ranges;

acquiring an absolute value of a difference between the numbers of the pixels in the adjacent ones of the image frames within each of the preset grayscale ranges, to obtain absolute values of differences respectively within respective ones of the preset grayscale ranges;

summing the absolute values of the differences to acquire a sum; and determining whether the sum is greater than a preset threshold, wherein determining that there is the scene change in the adjacent ones of the image frames when the sum is greater than the preset threshold.

* * * * *